US009624902B2

(12) United States Patent
Westergaard

(10) Patent No.: US 9,624,902 B2
(45) Date of Patent: Apr. 18, 2017

(54) ASSEMBLY METHOD FOR A MAIN ROTOR SHAFT AND AN INSTALLATION TOOL THERETO

(71) Applicant: ENVISION ENERGY (DENMARK) APS, Silkeborg (DK)

(72) Inventor: Jan Westergaard, Brande (DK)

(73) Assignee: Envision Energy (Denmark) ApS, Silkeborg (DE)

( * ) Notice: Subject to any disclaimer, the term of this patent is extended or adjusted under 35 U.S.C. 154(b) by 171 days.

(21) Appl. No.: 14/305,678

(22) Filed: Jun. 16, 2014

(65) Prior Publication Data
US 2014/0373353 A1 Dec. 25, 2014

(30) Foreign Application Priority Data

Jun. 19, 2013 (DK) .................................. 2013 70334

(51) Int. Cl.
F03D 1/06 (2006.01)
F03D 1/00 (2006.01)
(Continued)

(52) U.S. Cl.
CPC ........... *F03D 1/0666* (2013.01); *F03D 1/001* (2013.01); *F03D 15/00* (2016.05); *F03D 80/70* (2016.05);
(Continued)

(58) Field of Classification Search
CPC ........ F03D 1/0666; F03D 1/005; F03D 80/70; F03D 15/00; F03D 1/001; F05B 2230/60; F05B 2230/61; F05B 2240/14; B60P 1/04
(Continued)

(56) References Cited

U.S. PATENT DOCUMENTS

2001/0038207 A1* 11/2001 Willis ................... F03D 1/001
290/55
2014/0259590 A1* 9/2014 Eddy ..................... F03D 1/003
29/402.03

FOREIGN PATENT DOCUMENTS

CN 101903651 12/2010
CN 102011712 4/2011
(Continued)

OTHER PUBLICATIONS

Search Report prepared by the Danish Patent and Trademark Office on Feb. 3, 2014, for Dutch Application No. PA 2013 70334.

Primary Examiner — Moshe Wilensky
(74) Attorney, Agent, or Firm — James Creighton Wray; Meera P. Narasimhan

(57) ABSTRACT

The present invention relates to an installation tool for assembling a main rotor shaft unit and an assembly method thereof. The installation tool comprises a first element for supporting the generator end of the rotor shaft and a rotatable support plate is coupled to a second element of the installation tool via engaging coupling elements. The rotor shaft is rotated by a single crane unit via lifting elements mounted to the generator end, and then lifted out of the installation tool and placed on a floor. The bearing units are then mounted to the outer surface of the rotor shaft. The rotor shaft is afterwards lifted onto the installation tool so that the coupling element is brought into engagement and the rotor shaft is rotated on to the first element. This provides an installation tool that eliminates the need for two crane units to rotate the rotor shaft and reduces the amount of man-hours needed to assemble the rotor shaft unit by up to six hours. The installation tool also provides a stable tool for the workers since the center of gravity is located between the first element and the rotation point.

8 Claims, 8 Drawing Sheets

(51) Int. Cl.
  *F03D 80/70* (2016.01)
  *F03D 15/00* (2016.01)
(52) U.S. Cl.
  CPC ....... *F05B 2230/60* (2013.01); *F05B 2230/61* (2013.01); *Y02E 10/721* (2013.01); *Y02E 10/728* (2013.01); *Y02P 70/523* (2015.11); *Y10T 29/49316* (2015.01)
(58) Field of Classification Search
  IPC ........................................................ B60P 1/04
  See application file for complete search history.

(56) References Cited

FOREIGN PATENT DOCUMENTS

| | | |
|---|---|---|
| CN | 102792019 | 11/2012 |
| DE | 102011013844 A1 | 9/2012 |
| EP | 1617075 A1 | 7/2004 |
| EP | 2495433 A1 | 3/2011 |
| JP | 2003032974 | 1/2003 |
| WO | WO 2014002296 A1 | 1/2014 |

\* cited by examiner

ASSEMBLY METHOD FOR A MAIN ROTOR SHAFT AND AN INSTALLATION TOOL THERETO

CROSS-REFERENCE TO RELATED APPLICATIONS

This application claims the benefit of Danish Patent Application No. PA 2013 70334 filed Jun. 19, 2013, the entire contents of which are incorporated herein by reference.

FIELD OF THE INVENTION

The present invention relates to an installation tool for assembling a rotor shaft unit for a wind turbine comprising:
  a support frame comprising at least a first element and a second element which are configured to receive and hold a main rotor shaft of a wind turbine, wherein the rotor shaft has a generator end and a rotor end,
  wherein the first element is positioned towards the generator end of the rotor shaft when the rotor shaft is placed in the installation tool, and a first contact surface is arranged on the first element for contacting at least a part of a first outer surface on the rotor shaft.

The present invention also relates to a method for assembling a main rotor shaft unit of a wind turbine blade, wherein the method comprising the steps of:
  placing a main rotor shaft having a generator end and a rotor end on a first element and on a second element of an installation tool according to any one of claims 1 to 6 using lifting means, e.g. a crane unit;
  coupling the generator end to the lifting means for rotating the rotor shaft relative to the rotor end, e.g. via lifting elements mounted to the generator end.

BACKGROUND OF THE INVENTION

The size and weight of wind turbines and the blades thereof have increased which means that the size and structural strength of the rotor hub have increased, and the main rotor shaft and other components of the nacelle have to be dimensioned according to the increased loads on the wind turbine. Today, the main rotor shaft form a large and heavy structure as it has to transfer the rotational torque generated by the wind loads to the drivetrain in the nacelle, e.g. via a gearbox. This makes the rotor shaft difficult to handle during the assembly process and often requires the use of two cranes.

The two main shaft bearings are normally mounted when the main rotor shaft is placed in a vertical position. The rotor shaft is normally rotated by attaching at least one strap to the generator end of the main shaft and at least one other strap to the rotor end when the shaft is resting on its support frame in horizontal position. The straps are then coupled to guide wires in the cranes so that one crane guides the generator end while the other crane guides the rotor end. The main rotor shaft is then lifted and rotated into a substantially vertical position before being placed on the floor or on a platform. The main rotor bearings are then mounted by guiding them onto the shaft from the generator end. The use of two cranes means that the main rotor shaft cannot be rotated into a right angle relative to the floor, thereby creating a dangerous situation for the workers as the weight of the main rotor shaft will cause the shaft to sway as the rotor end is brought into contact with the surface of the floor. This also increases the risk of damaging the main rotor shaft as the rotor end is placed on its edge before the end surface is brought into contact with the floor. The use of two cranes presents a time consuming process which requires at least two workers to operate the cranes.

This can be avoided by first lowering the shaft onto a set of support elements of wood. The straps on the rotor end are then removed and the shaft is lifted off the support elements which are then removed and the shaft is lowered onto the floor. However, these support elements can accidentally be pushed out or removed thereby causing the main rotor shaft to sway uncontrollably, or even tip over. The main rotor shaft may be placed in an area of loose gravel or the like. The small rocks may block the mounting holes in the rotor end and then have to be removed after assembly which in turn increases the assembly time.

The main rotor bearings may also be installed when the main rotor shaft is positioned in a horizontal position. However, this is a much more complicated process which requires a more accurate guidance of the bearings, in particular the main shaft bearing, when they are moved along the length of the shaft. This assembly method presents a significant problem as the main shaft bearing has to be guided past at least one of the contact surfaces of the support frame in order to be brought into position on the shaft.

OBJECT OF THE INVENTION

An object of this invention is to provide an installation tool for a main rotor shaft that allows the rotor shaft to be rotated when placed in the tool.

An object of the invention is to provide an installation tool that increases the safety for the workers during assembly.

An object of the invention is to provide an assembly method for a main rotor shaft unit that reduces the amount of man-hours needed in order to assemble the rotor shaft unit.

DESCRIPTION OF THE INVENTION

An object of the invention is achieved by an installation tool characterised in that:
  the support frame comprises means for rotating the rotor shaft around at least one rotation point located on the second element from a first position to a second position in which the centre axis of the rotor shaft extends in a perpendicular direction relative to the longitudinal direction of the support frame.

This allows the main rotor shaft to be rotated when it is still placed in the installation tool, and thereby increasing the safety of the workers located around the main rotor shaft. The installation tool allows the main rotor shaft to be rotated by one worker operating the rotating means, and thereby eliminating the need for two cranes and two workers in order to rotate the shaft. This in turn reduces the total assembly time of the rotor shaft unit, i.e. mounting the bearings and housings thereof onto the outer surface of the shaft.

The support frame may in a simple structure comprise a base unit configured to be placed on a floor or another planar surface. The first element is coupled to the base unit and may be configured as an arm, e.g. a Y-shaped arm, extending outwards from the base unit. The free end of the arm may be configured as a recess having a contact surface shaped to follow at least a part of the outer surface of the rotor shaft. The first element may instead be configured as a plate or another support structure where the recess is arranged at the free end facing the rotor shaft. The contact surface may be covered with a soft deformable material, such as plastic, a weaved fabric, or another padding, for protecting the rotor shaft. The height and distance between the two elements may be adapted to the size and configuration of the rotor shaft.

In one embodiment, a support plate configured to be mounted to the rotor end of the rotor shaft is rotatable coupled to the second element at the rotation point, wherein the support plate comprises a contact surface for contacting a third contact surface on the rotor end when the support plate is mounted to the rotor shaft.

The support plate allows the main rotor shaft to be mounted or fixed to the installation tool so that it does not slide or turn relative to the support frame during the rotation. This allows the rotor shaft to be rotated using a single lifting unit, such as an external crane unit or a lifting unit coupled to the support frame. The use of a rotatable support plate allows the rotor shaft to be rotated faster and safer than when using two cranes. This allows the assembly time to be reduced with up to six man-hours.

The support plate may comprise one or more mounting holes for mounting the support plate to one or more mounting holes in the rotor end. Fastening means, such as bolts, nuts or screws, may be used to mount the support plate to the rotor end. The mounting holes on the support plate may be aligned with the primary mounting holes in the rotor end used to mount the rotor shaft to the rotor hub or may be aligned with one or more secondary mounting holes arranged in the rotor end. The size and configuration of the mounting surface may be adapted to the desired configuration of the rotor end of the rotor shaft.

In one embodiment, the centre of gravity of the support frame is located between the point of rotation and the first element when the rotor shaft is placed in the installation tool.

This allows the installation tool to use its own weight to prevent it from tipping over since the centre of gravity is located between the two support elements which hold the rotor shaft. This increases the safety for the workers and provides a stable tool for the workers since the rotor shaft does not have to be placed on a set of wooden support elements before being lifted onto the floor.

In a special embodiment, the support plate is removable coupled to the second element via at least a first coupling element located on the support plate configured to engage at least a second coupling element located on the second element, wherein the first coupling element is configured to rotate relative to the second coupling element when the support plate is coupled to the second element.

This allows the support plate to be mounted to the rotor end at the start of the assembly process before the rotor shaft is lifted into position on the installation tool using a crane unit. The support plate may comprise at least one lifting element in the form of a hook or ring for lifting the support plate out of the support frame and into position relative to the rotor end of the rotor shaft. The lifting element may be arranged on one of the sides of the support plate. The lifting element is preferably located at a balance point on the support plate, e.g. a point over the centre of gravity, so that the support plate hangs downwards from the crane wire in a more or less vertical position. This allows a quick and easy alignment of the support frame relative to the rotor end since the mounting holes in the support frame only have to be rotated to the nearest mating mounting holes if needed.

In one embodiment, the second element comprises means for locking the rotor shaft relative to the second element when the rotor shaft is rotated around the rotation point.

This allows the support plate to be secured to the second element so that the coupling elements do not accidently disengage during the rotation causing a dangerous situation for the workers. The locking means may be disengaged or removed when the support plate is lifted out of the second element and engaged or put into place when the support plate is lowered onto the second element again. The locking means may be configured as an electrically activated unit in which a sensor or detector senses/detects when the support plate is lifted out of the second element. The signal from the sensor/detector is then used to activate a mechanical moveable element, e.g. a pin, which prevents the two coupling elements from disengaging. In a simple embodiment, the locking means may be a removable pin or locking latch, e.g. comprising a through hole at the free end for receiving a locking split.

The first element may comprise a moveable sub-element, such as a clamping element, configured to be moved or rotated over the rotor shaft for locking the generator end to the first element. The sub-element may be locked to the arm by fastening means such as a bolt, nut, screw, clamp, or another suitable fastening means.

The second element may be configured as two outwards extending support arms or plates where the support plate is arranged in between the two support arms. The coupling element may be located at the free end of the arms and may be configured as a recess, e.g. Y-shaped recess, or a through-hole for at least partly receiving a mating coupling element on the support plate. The coupling element may be arranged on at least one of the sides of the support plate and may be configured as an axle extending outwards from the side of the support plate. In one embodiment, the support element comprises two axles aligned with each other so that they form a rotation axis around which the rotor shaft is able to rotate.

In one embodiment, at least one actuator is coupled to the support frame and comprises at least moveable one element having a fourth contact surface for contacting at least partly a fifth contact surface of the rotor shaft, wherein the actuator is driven by a hydraulic, electrical or pneumatic drive unit.

The rotor shaft may be rotated using one or more actuators in the form of moveable pistons arranged on the support frame where the free end of the pistons may be configured to clamp or at least partly receive the rotor shaft. The piston may be coupled to an internal or external drive unit which uses an electrical current, a hydraulic fluid or compressed air to drive the piston. In one embodiment, a crane unit is used to rotate the rotor shaft where one or more lifting elements may be mounted to the generator end which is then coupled to the crane wire.

An object of the invention is also achieved by an assembly method characterised in that:
- the rotor end is coupled to a rotation point in the second element, and
- the generator end is rotated around the rotation point from a first position to a second position in which the centre axis of the rotor shaft extends in a direction perpendicular to the longitudinal direction of the support frame.

This provides an assembly process which requires the use of two crane units to rotate the main rotor shaft during the assembly. The installation tool allows a single worker to rotate the rotor shaft when it is placed in the tool which reduces the amount of man-hours needed to assemble the rotor shaft unit with up to six hours. This also increases the safety for the worker since the centre of gravity of the installation tool with the rotor shaft is located between the rotation point and the position of the first element. This provides a more stable tool during the rotation of the rotor shaft.

When the rotor shaft is placed in the installation tool, one or more lifting elements are mounted to a corresponding number of mounting holes in the generator end. The crane unit is then coupled to a crane unit and the worker uses the crane unit to rotate the rotor shaft. The worker may instead couple the rotor shaft to an actuator in the installation tool and rotate the rotor shaft by extending the piston of the actuator.

In one embodiment, a support plate is mounted to the rotor end of the rotor shaft, and wherein the support plate is rotated around the rotation point.

The rotor shaft may be mounted to a support plate in the installation tool so that it does not slide or turn relative to the installation tool during the rotation. This increases the safety for the worker and allows for a faster and easier rotation of the rotor shaft than if two crane units were used. The rotor shaft may be lifted into position on the installation tool by using two or more slings or wires coupled to the crane unit. The rotor end is then aligned with the mounting holes on the contact surface of the support element and mounted to the support element. The support plate is rotated relative to the second element via one or more engaging coupling elements on the support element and the second plate respectively.

In a special embodiment, the support plate is removed from the installation tool and mounted to the rotor end before the rotor shaft is placed in the installation tool.

The support plate may be mounted to the rotor end before the rotor shaft is placed in the installation tool. This may be done when the rotor shaft is still placed in the lathe or on a temporary support frame. The support frame may be lifted out of engagement with the second element using at least one lifting element located on the side of the support plate. The support plate is lifted in a balanced position which allows for a quicker mounting to the rotor end since the mounting holes of the support plate only have to be rotated to the nearest mounting hole on the rotor end if needed.

The rotor shaft may then be lifted into position on the installation tool again by coupling the crane wire to one or more holes in the generator and rotor ends, e.g. via one or more hooks or carbine hooks. Alternatively, one or more slings or wires may be arranged around the rotor shaft and coupled to the crane wire.

The rotor shaft is then placed in the installation tool so that the rotor shaft contacts the first element near the generator end and the coupling elements of the support plate are brought into engagement with the coupling elements on the second element. Locking means on the second element may be used to prevent the coupling elements from disengaging during the rotation.

In one embodiment, the rotor shaft is lifted out of the installation tool after being rotated and then placed on a surface, e.g. a floor, where the rotor shaft rests on top of the support plate.

The installation tool allows the rotor shaft to be rotated and lifted onto the floor using the same crane unit. The rotor shaft is simply lifted out of the installation tool and placed on the floor. This significantly reduces the risk of damaging the rotor end when the rotor shaft is brought into contact with the floor since the crane unit may be aligned with the centre axis of the rotor shaft. Furthermore, the support plate acts as a platform for the shaft during the mounting of the bearing units and is able to absorb any impacts with the floor as the rotor shaft is lowered into position.

This also eliminates the need for placing the rotor shaft on a set of wooden support element before lowering onto the floor since the support plate is mounted to the rotor end and is used as a platform for the rotor shaft.

In one embodiment, one or more bearing units are guided into position on the rotor shaft from the generator end and mounted to the rotor shaft, after which the rotor shaft is placed in the installation tool again using the lifting means.

Placing the rotor shaft in a vertical position allows a much easier assembly of the bearing units on the rotor shaft. The bearing units may be guided into position from the generator end by using their own weight to guide them into position. One or more sealing elements, e.g. a seal ring, may be mounted to the outer surface of the rotor shaft at a location near the rotor end. One or more bearings are then expanded by heating them and then guided into position on the sealing elements. The cooling of the bearings means that they will form a tight fit around the outer surface of the rotor shaft. The housing is then guided into position on the bearings and the housing may be sealed off. A second bearing unit may be mounted to the outer surface of the rotor shaft at a location near the generator end in a similar manner. The second bearing unit may instead be a rotor braking unit, e.g. a mechanical or electrical braking unit.

After the bearing units have been mounted, the rotor shaft may then be placed in the installation tool again by coupling the crane unit to the lifting elements. The coupling elements of the support plate are brought into engagement with the mating coupling element on the second element. The rotor shaft is then rotated around the rotation point until the rotor shaft is brought into contact with the first element again. The crane unit and lifting element are then removed and the remaining components, such as one or more service platforms, service latters and other components are finally mounted to the rotor shaft unit.

The installation tool may also be used to transport the rotor shaft unit to the installation site which eliminates the need for a transport frame. The rotor shaft may be secured to the first element also during transportation, e.g. by a clamping element or one or more transport straps. The rotor shaft may then be lifted up to the nacelle by coupling two or more slings or wires to the rotor shaft which in turn is coupled to a crane unit at the site. The crane wire may instead be coupled to both ends of the rotor shaft by coupling the crane wire to one or more holes in both ends of the rotor shaft, e.g. via one or more hooks or carbine hooks. One or more mounting flanges of the bearing housings of the rotor shaft unit is then positioned on and mounted to mating mounting flanges in the nacelle, after which the support plate may be demounted and lifted down onto the installation tool again.

DESCRIPTION OF THE DRAWING

The invention is described by example only and with reference to the drawings, wherein.

In the following text, the figures will be described one by one and the different parts and positions seen in the figures will be numbered with the same numbers in the different figures. Not all parts and positions indicated in a specific figure will necessarily be discussed together with that figure.

DETAILED DESCRIPTION OF THE INVENTION

REFERENCE LIST

Figure 1:
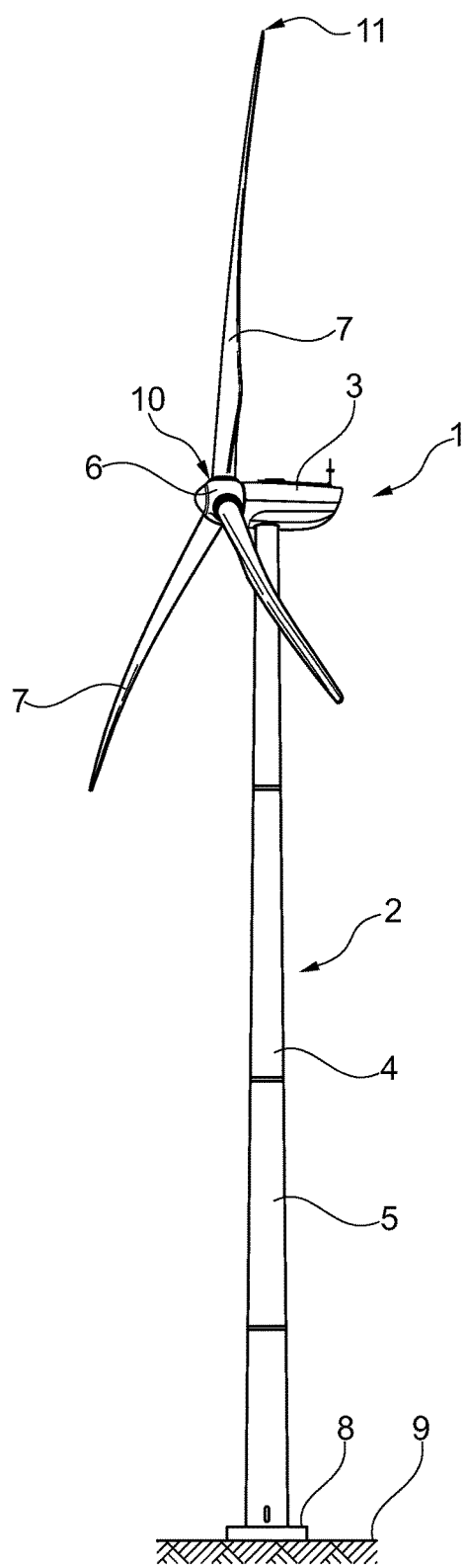
FIG. 1 shows an exemplary embodiment of a wind turbine.

1 Wind turbine
2 Wind turbine tower
3 Nacelle
4, 5 Tower sections
6 Rotor hub
7 Wind turbine blade
8 Foundation
9 Ground level
10 Blade root
11 Tip end
12 Installation tool
13 Support frame
14 Main rotor shaft
15 Base unit
16 First element
17 Contact surface on first element
18 Contact surface on rotor shaft
19 Second element
20, 21 Support arms
22 Support plate
23 Rotating coupling
23a, 23b Coupling elements
24 First contact surface on support plate
25 Contact surface on rotor shaft
26 Mounting holes on support plate
27 Mounting holes on rotor shaft
28 Second contact surface on support plate
29 Free end of support arm
30, 31 Side surfaces on support plate
32 Contact surface on first coupling element
33 Contact surface on second coupling element
34 Flange
35 Removable pin
36 Through-hole
37 Through-hole
38 Lifting element
39 Side surface on support plate
40 Crane unit
41 Crane wire
42 Generator end
43 Rotor end
44 Outer surface of rotor shaft
45 Contact surface on rotor shaft
46 First bearing unit
47 Contact surface on rotor shaft
48 Second bearing unit
49 Primary mounting holes
50, 51 Holes
52 Lifting element
53 Straps, slings
54 Service latter
55 Service platform
56 Mounting flanges FIG. 1 shows an exemplary embodiment of a wind turbine 1 with a wind turbine tower 2 and a nacelle 3 mounted on top of the wind turbine tower 2. The wind turbine tower 2 may comprise two or more tower sections 4, 5 mounted on top of each other. A rotatable rotor hub 6 may be mounted to the nacelle 3 via a rotor shaft (not shown). Two or more wind turbine blades 7 may be mounted to the rotor hub 6 extending outwards from the centre of the rotor hub 6. The wind turbine blades 7 may be coupled to the rotor hub 6 via at least one pitch system (not shown) configured to pitch the blade 7 or a section thereof into a pitch angle relative to the length of the blade 7. The wind turbine tower 2 may be mounted onto a foundation 8 extending above a ground level 9.

The wind turbine blade 7 may comprise a blade root 10 configured to be mounted to the rotor hub 6 and a tip end 11 arranged at the free end of the blade 7. The wind turbine blade 7 may have an aerodynamic profile along the length of the blade 7.

Figure 2:
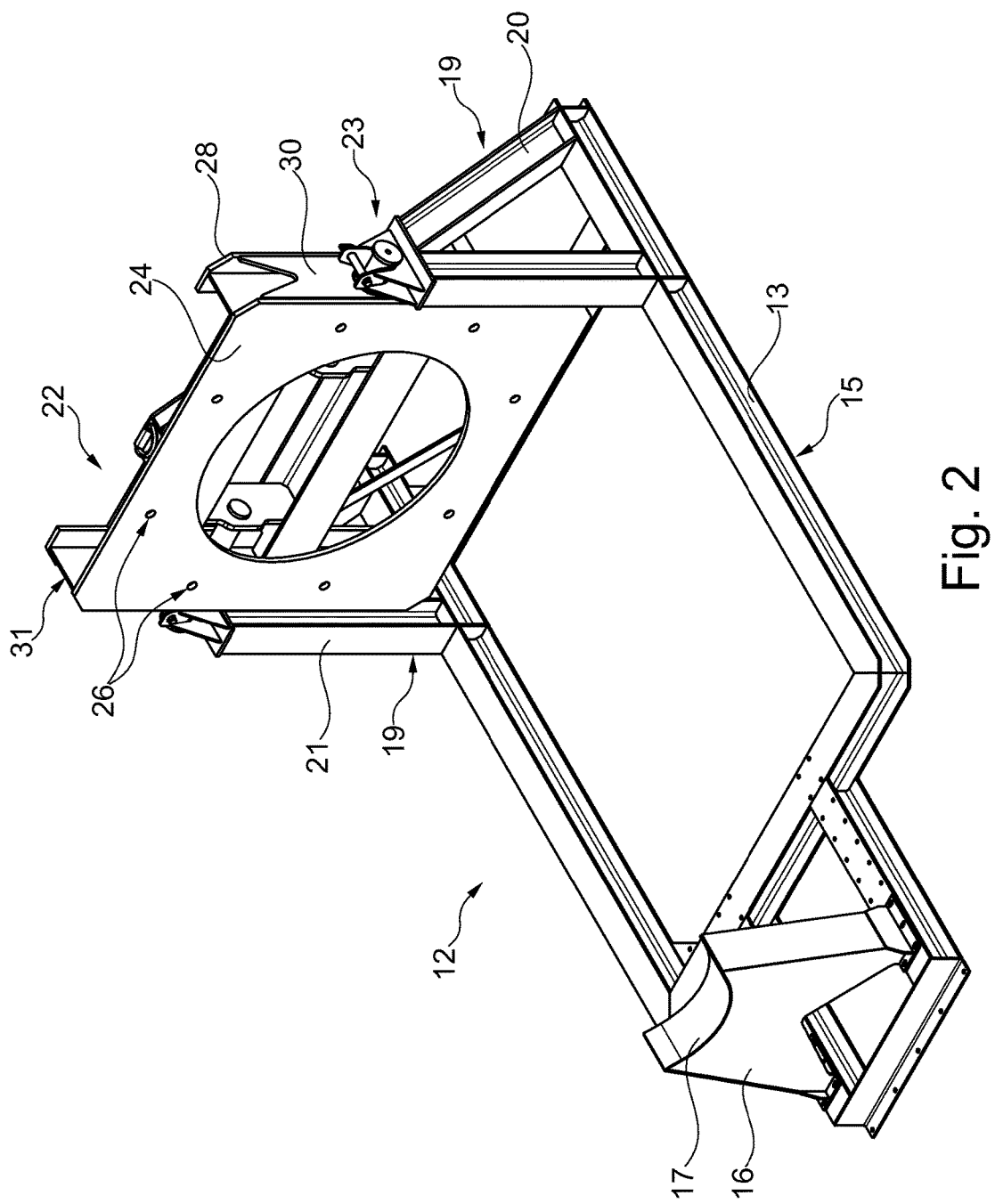
FIG. 2 shows an exemplary embodiment of an installation tool according to the invention.

FIG. 2 shows an exemplary embodiment of an installation tool 12 according to the invention. The installation tool 12 may comprise a support frame 13 configured to receive and hold a main rotor shaft 14 which is designed and configured to be installed in the wind turbine 1. The support frame 13 may comprise a base unit 15 configured to be placed on a floor or another planar surface such as a platform. The base unit 15 may comprise a contact surface for contacting a contact surface on the floor.

At least one first element 16 may be coupled to the base unit 15 and extend outwards from the base unit 15, e.g. in a direction perpendicular to the longitudinal direction of the base unit 15. The first element 16 may be configured as an arm having a free end facing away from the base unit 15. The first element 16 may comprise a contact surface 17 located at the free end for contacting at last a part of a contact surface 18 on the rotor shaft 14. The free end of the arm 16 may form a recess in which the rotor shaft 14 may be placed.

At least one second element 19 may be coupled to the base unit 15 and extend outwards from the base unit 15, e.g. in a direction perpendicular to the longitudinal direction of the base unit 15. The second element 19 may be arranged on the base unit 15 at the opposite end of the first element 16, as shown in FIG. 2. The second element 19 may be configured as two support arms 20, 21 extending outwards from the base unit 15, e.g. in a direction perpendicular to the longitudinal direction of the base unit 15. The support arms 20, 21 may at their free end be configured to form a rotation point around which a rotatable support plate 22 may rotate. The height of each element 16, 19 and the distance between the two elements 16, 19 may be adapted to the size and configuration of the rotor shaft 14.

The support plate 22 may be arranged between the support arms 20, 21 and may be coupled to each of the arms 20, 21 via a rotating coupling 23. The support plate 22 may be configured as a mounting plate for mounting to the rotor shaft 14. The support plate 22 may comprise a first contact surface 24 for contacting a contact surface 25 on the rotor shaft 14. The contact surface 25 may comprise one or more mounting holes 26 for mounting the support plate 22 to one or more mating mounting holes 27 on the rotor shaft 14 via fastening means, such as bolts, nuts, or screws. In one embodiment, at least three mounting holes 26 are arranged in the contact surface 25, eight holes are shown in FIG. 2. A second contact surface 28 may be arranged at the opposite side of the support plate 22 for contacting the surface of the floor. The size and configuration of the support plate 22 and the contact surface 25 may be adapted to the desired configuration of the rotor shaft 14.

Figure 3:
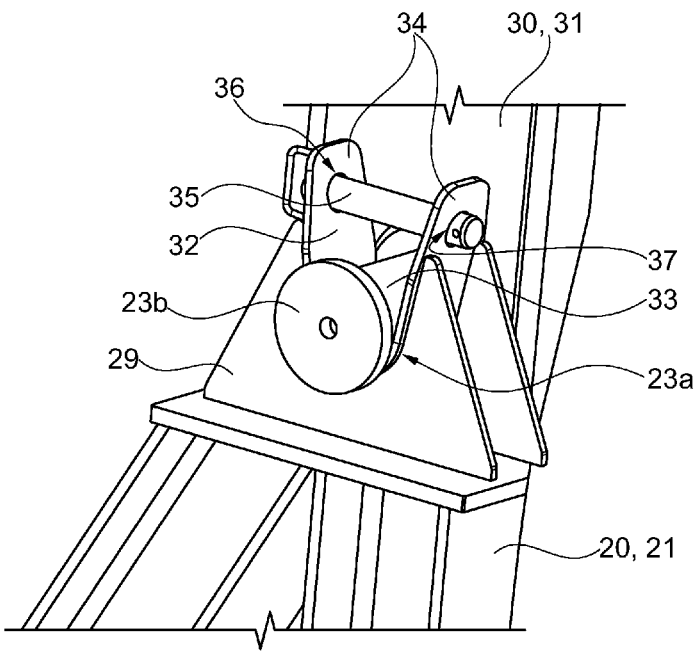
FIG. 3 shows an enlarged image of the rotating coupling between the second element and the support plate.

FIG. 3 shows an enlarged image of the rotating coupling 23 shown in FIG. 2. The support plate 22 may be removable coupled to each of the two second elements 19 via a first coupling element 23a configured to engage a second coupling element 23b. The first coupling element 23a may be located at the free end 29 of the support arm 20, 21 and a second coupling element 23b may be located at a side surface 30, 31 on the support plate 22. The first coupling element 23a may be configured as a recess configured to receive and hold the second coupling element 23b. The second coupling element 23b may be configured as an axle extending outwards from the side surface 30, 31. The first coupling element 23a may comprise a contact surface 32 shaped to follow at least a part of a contact surface 33 on the second coupling element 23b. The coupling elements 23a, 23b may be aligned with each other so that they form a common rotation axle around which the support plate 22 may rotate.

The first coupling element 23a may comprise at least one outwards extending flange 34, two flanges are shown in FIG. 3, for guiding the second coupling element 23b into position. The flanges 34 may be placed in an angle, e.g. an acute angle, relative to the rotation point or to each other. The flanges 34 may be placed in an angle between 0 degrees and 90 degrees relative to each other, as shown in FIG. 3. This allows the support plate 22 to be guided into position on the second support element 19.

Locking means in the form of a removable pin 35, e.g. a locking pin, may be arranged at the free ends of the flanges 34. Both flanges 33 may comprise a through-hole 36 for receiving the pin 35. The pin 35 may comprise a through-hole 37 for receiving a removable locking split (not shown). The locking split may be coupled to or form part of the pin 35. This allows the support plate 22 to be secured to the second element 19 during the rotation.

Figure 4:
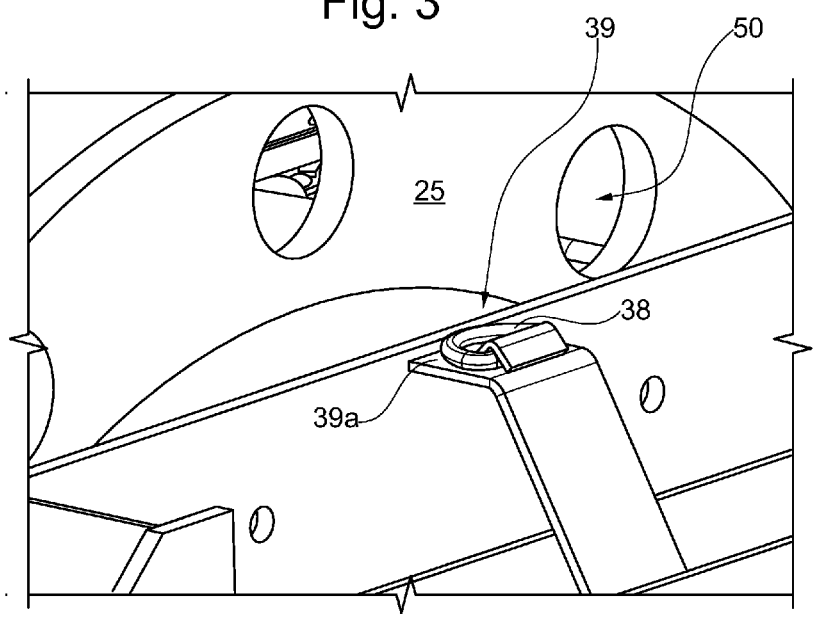
FIG. 4 shows an exemplary embodiment of a lifting element of the support plate.

FIG. 4 shows an exemplary embodiment of a lifting element 38 coupled to the support plate 22. The lifting element 38 may be arranged on a third side surface 39, e.g. on a flange 39a, on the support plate 22. The lifting element 38 may be configured as a ring for lifting the support plate 22 in and out of engagement with the second element 19 via a crane unit 40. The lifting element 38 may be located at a balance point of the support plate 22, e.g. a point over the centre of gravity, so that it hangs downwards from a crane wire 41 in a more or less vertical position.

Figure 5:
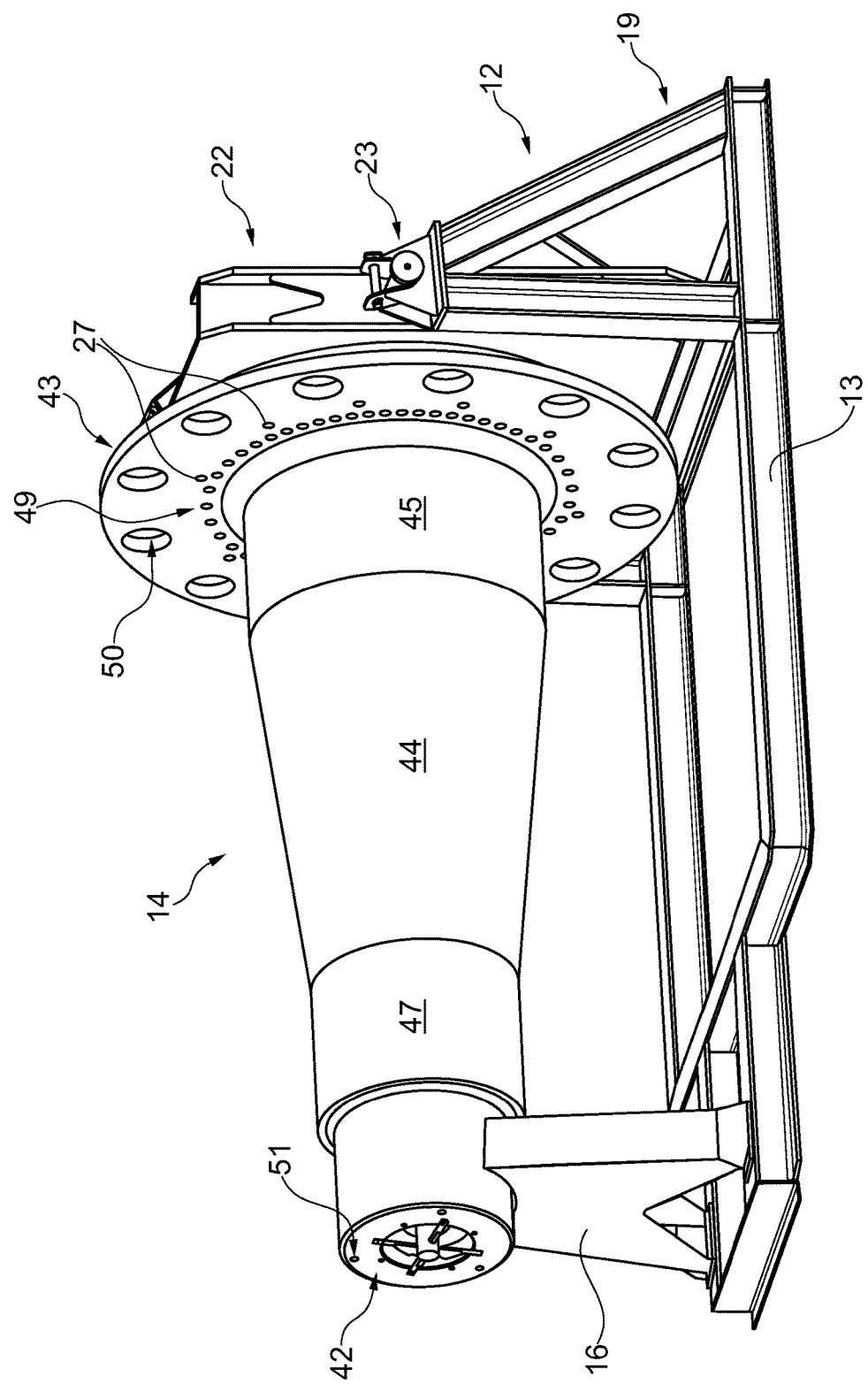
FIG. 5 shows a first step of an assembly method according to the invention.

FIG. 5 shows a first step of an assembly method for assembling a rotor shaft unit according to the invention. The rotor shaft 14 may comprise a generator end 42 connected to a rotor end 43 via at least one outer surface 44. The rotor shaft 14 may comprise a first contact surface 45 for contacting a first bearing unit 46 and a second contact surface 47 for contacting a second bearing unit 48.

Before the rotor shaft 14 may be placed in the support frame 13 of the installation tool 12, the crane wire 41 may be coupled to the lifting element 38 and the support plate 22 may be lifted out of engagement with the second element 19. The support plate 22 may then be positioned relative to the rotor shaft 14 so that the contact surface 24 on the support plate 22 may be aligned with the contact surface 25 of the rotor end 43. The support plate 22 may then be mounted to the rotor end 43 via the mounting holes 26, 27. The mounting holes 27 may arranged between the primary mounting holes 49 of the rotor end 43 or offset relative to the primary mounting holes 49, as shown in FIG. 5.

The rotor shaft 14 may then be lifted into position on the installation tool 12 by coupling the crane wire 41 to one or more holes 50, 51 in the generator and rotor ends 42, 43, e.g. via one or more hooks or carbine hooks. The contact surface 18 may be located towards the generator end 42, as shown in FIG. 5, e.g. between the generator end 42 and the second contact surface 47. The rotor shaft 14 may be lowered into position so that the rotor shaft 14 contacts the first element 16 and the coupling elements 23b of the support plate 22 is brought into engagement with the coupling elements 23a on the second element 19.

Figure 6:
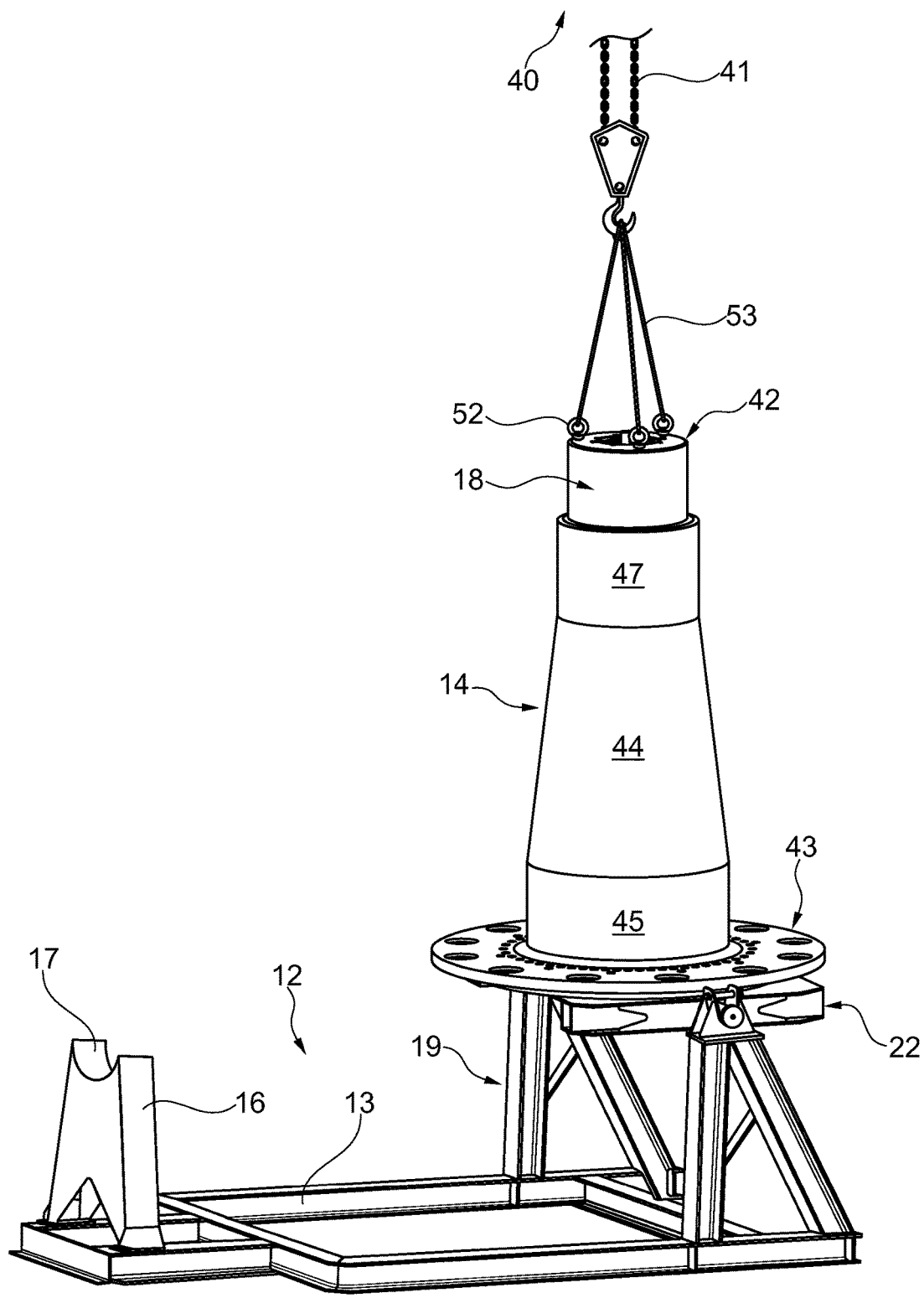
FIG. 6 shows a second step of an assembly method according to the invention.

FIG. 6 shows a second step of the assembly method where the rotor shaft 14 is rotated into a second position relative to the support frame 13.

Before rotating the rotor shaft 14, one or more removable lifting elements 52 may be mounted to one or more of the holes 51, e.g. mounting holes, in the generator end 42. Three lifting elements 52 may be mounted to the generator end 42, as shown in FIG. 6. The lifting elements 52 may comprise an eye to which the crane wire 41 may be coupled, e.g. via one or more straps or slings 53. The support plate 22 may be secured to the second element 19 by locking the pin 35 in place on the flanges 33. The crane unit 40 may then be used to rotate the rotor shaft 14 and the support plate 22 around the rotation point from a first position, as shown in FIG. 5, to the second position, as shown in FIG. 6, in which the centre axis of the rotor shaft 14 may extend in a direction perpendicular to the longitudinal direction of the support frame 13.

The installation tool 12 may be configured so that the centre of gravity of the support frame 13 and the rotor shaft 14 during the rotation continuously may be located between the rotation point defined by the coupling 23 and the contact surface 17 of the first element 16, as indicated in FIG. 6. This provides a sable installation tool 12 and increases the safety for the worker rotating the rotor shaft 14 via the crane unit 40.

Figure 7:
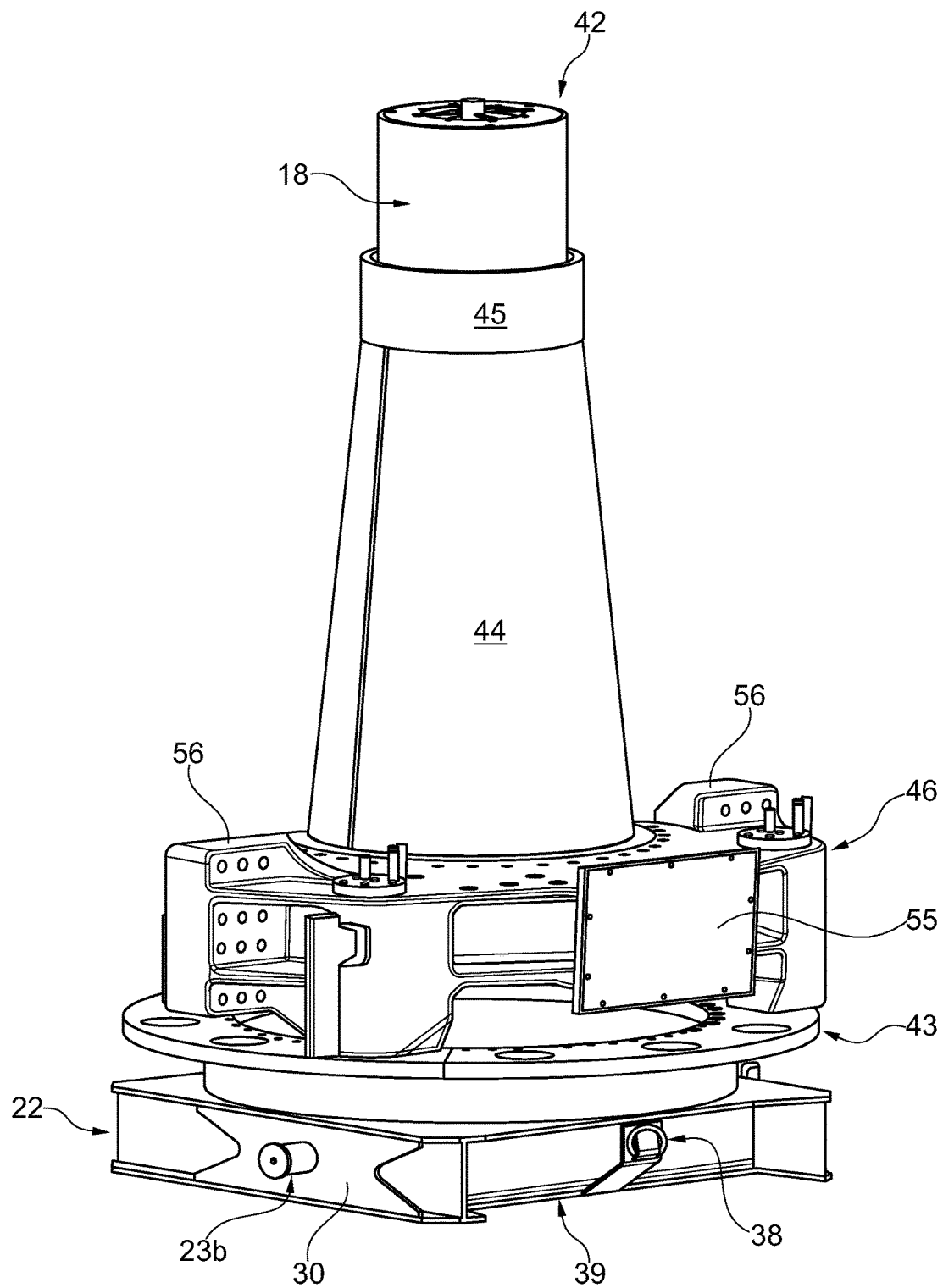
FIG. 7 shows a third step of an assembly method according to the invention.

FIG. 7 shows a third step of the assembly method where the rotor shaft 14 is placed on a floor or another planar surface (not shown).

After the rotor shaft 14 has been rotated, the rotor shaft 14 may be lifted so that the coupling elements 23b on the support plate 22 is brought out of engagement with the coupling elements 23a on the second element 19. The locking pin 35 may be removed from the flanges 33 before lifting the rotor shaft 14. The rotor shaft 14 may then be placed on the floor so that the contact surface 28 is brought into contact with the surface of the floor. The crane unit 40 may then be decoupled from the lifting elements 52. This allows the rotor shaft 14 to rest on the support plate 22.

Then, a first bearing unit 46 may be mounted to the contact surface 45 located near the rotor end 43 of the rotor shaft 14. The bearing unit 46 may comprise a housing in which one or more different components may be arranged, such as one or two inner sealing elements, one or two bearings (SRBs, TRBs or CRBs), one or two outer sealing elements, or other relevant components. The bearings and/or sealing elements may be heated to a predetermined temperature before they are lowered onto the rotor shaft 14 through the generator end 42 and into position using the crane unit 40. The components of the bearing unit 46 and the mounting of these are known and will not be described in further details.

Figure 8:
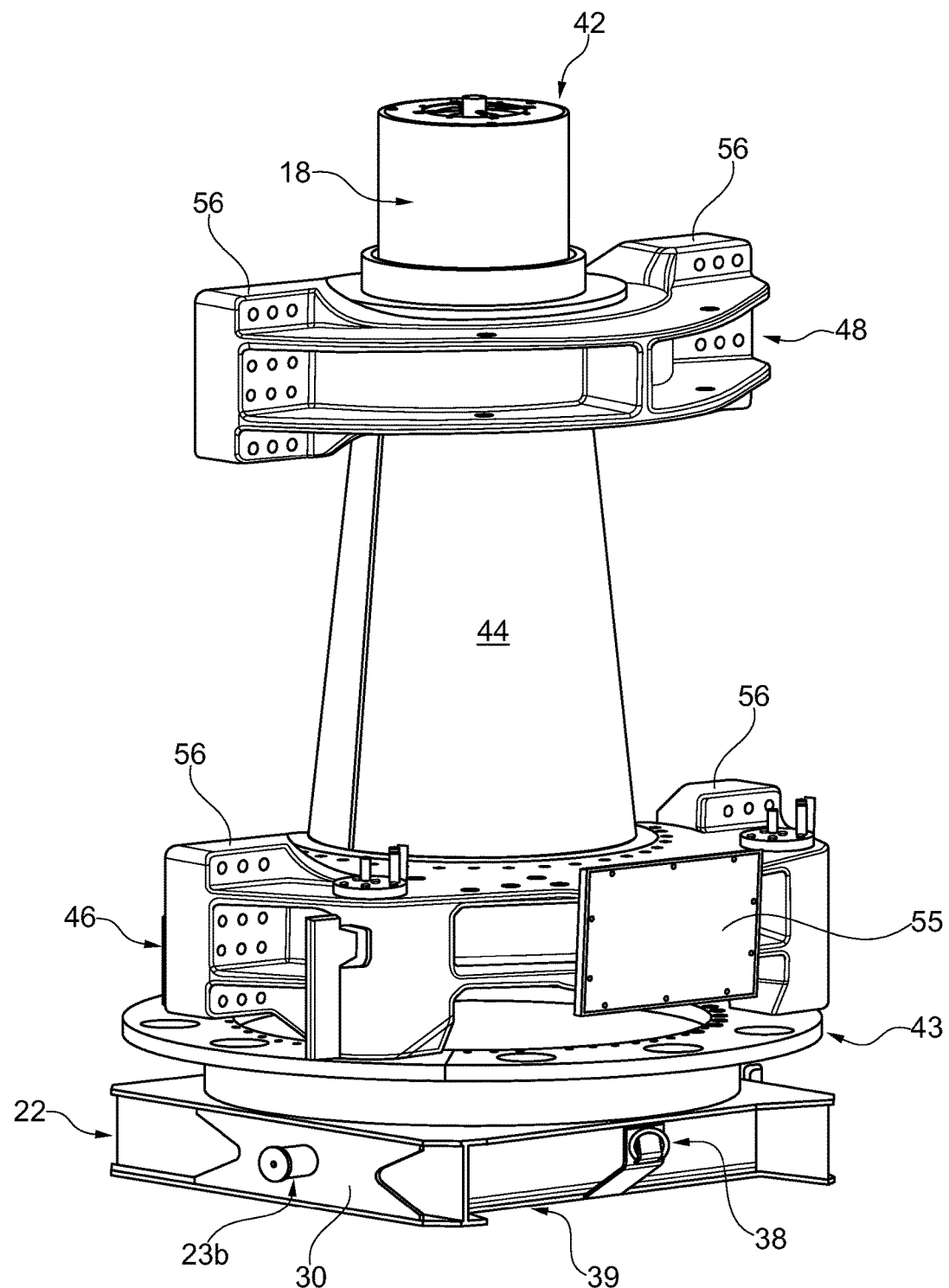
FIG. 8 shows a fourth step of an assembly method according to the invention.

FIG. 8 shows a fourth step of the assembly method where a second bearing unit 48 is mounted on the rotor shaft 14.

Then, a second bearing unit 48 may be mounted to the contact surface 47 located near the generator end 42 of the rotor shaft 14. The bearing unit 48 may comprise a housing in which one or more different components may be arranged, such as one or two inner sealing elements, one or two bearings (SRBs, TRBs or CRBs), one or two outer sealing elements, or other relevant components. The bearings and/or sealing elements may be heated to a predetermined temperature before they are lowered onto the rotor shaft 14 through the generator end 42 and into position using the crane unit 40. The components of the bearing unit 48 and the mounting of these are known and will not be described in further details.

Figure 9:
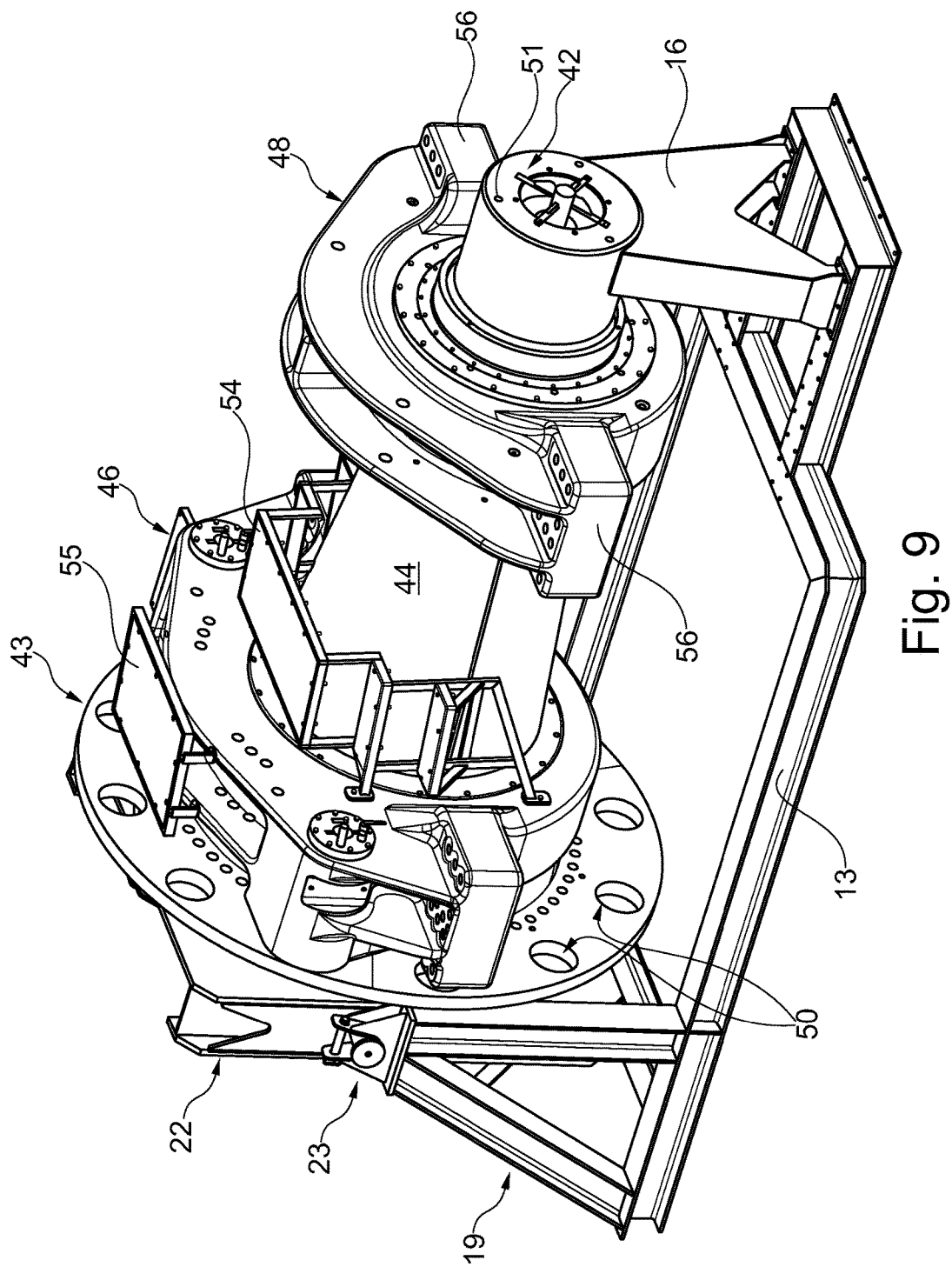
FIG. 9 shows a fourth step of an assembly method according to the invention.

FIG. 9 shows a fourth step of the assembly method where the rotor shaft unit is placed on the support frame 13 of the installation tool 12.

After the bearing units 46, 48 have been mounted, the rotor shaft unit may then be lifted onto the installation tool 12 for final assembly. The crane unit 40 may be coupled to the lifting elements 52 again, e.g. via one or more straps or slings. The rotor shaft unit may then be lifted and positioned relative to the second element 19 using the crane unit 40. The rotor shaft unit may be lowered into position so that the coupling elements 23a, 23b are brought into engagement again. The locking pin 35 may then be mounted to the flanges 34 and the rotor shaft unit may be rotated in a reverse direction relative to the rotation point. Finally, the crane unit 40 may be decoupled from the lifting element 52 after the rotor shaft 14 is brought into contact with the first element 16. The lifting element 52 may also be demounted.

The remaining components of the rotor shaft unit may then be mounted to the rotor shaft 14 and the bearing units 46, 48. One or more service latters 54, service platforms 55 and other items may be mounted to complete the rotor shaft assembly.

In one embodiment, the rotor shaft 14 may be firmly coupled to the first element 16 for trans-porting the assembled rotor shaft unit. At the installation site, the fastening means at the first element 16 and the locking pin 35 may be removed and the rotor shaft unit may then be lifted into position in the nacelle 3 using another crane unit. The generator and rotor ends 42, 43 may be coupled to the nacelle by bringing the mounting flanges 56 into contact with mating mounting flanges located inside the nacelle 3. The support plate 22 may then be demounted and lowered into position on the installation tool 12 again.

The invention claimed is:

1. A method for assembling a main rotor shaft unit of a wind turbine blade, comprising the steps of:
    providing an installation tool comprising a support frame comprising at least a first element and a second element which are configured to receive and hold a main rotor shaft of a wind turbine, the rotor shaft having a generator end and a rotor end, wherein the first element is positioned towards the generator end of the rotor shaft when the rotor shaft is placed in the installation tool, and a first contact surface is arranged on the first element for contacting at least a part of a first outer surface on the rotor shaft, wherein the support frame further includes means for rotating the rotor shaft around at least one rotation point located on the second element from a first position to a second position in which the centre axis of the rotor shaft extends in a perpendicular direction relative to the longitudinal direction of the support frame;
    placing a main rotor shaft having a generator end and a rotor end on the first element and on the second element of the installation tool using lifting means;
    coupling the rotor end to the rotation point in the second element; and
    rotating the generator end around the rotation point from the first position to the second position so the centre axis of the rotor shaft extends in a direction perpendicular to the longitudinal direction of the support frame.

2. The method according to claim 1, wherein a support plate is mounted to the rotor end of the rotor shaft and the support plate is rotated around the rotation point.

3. The method according to claim 2, wherein the support plate is removed from the installation tool and mounted to the rotor end before the rotor shaft is placed in the installation tool.

4. The method according to claim 2, wherein the rotor shaft is lifted out on the installation tool after being rotated, and then placed on a surface, where the rotor shaft rests on top of the support plate.

5. The method according to claim 1, wherein one or more bearing units are guided into position on the rotor shaft from the generator end and mounted to the rotor shaft, after which the rotor shaft is placed in the installation tool again using the lifting means.

6. The method according to claim 3, wherein the rotor shaft is lifted out on the installation tool after being rotated, and then placed on a surface, where the rotor shaft rests on top of the support plate.

7. The method according to claim 1, wherein said rotor shaft is rotated relative the rotor end via lifting elements mounted to the generator end.

8. The method according to claim 1, wherein at least one actuator with at least one moveable element is coupled to the support frame, and the rotor shaft is rotated relative the rotor end by moving the element.

* * * * *

UNITED STATES PATENT AND TRADEMARK OFFICE
CERTIFICATE OF CORRECTION

PATENT NO. : 9,624,902 B2  
APPLICATION NO. : 14/305678  
DATED : April 18, 2017  
INVENTOR(S) : Jan Westergaard Page 1 of 1

It is certified that error appears in the above-identified patent and that said Letters Patent is hereby corrected as shown below:

On the Title Page

Item (73) Assignee should read:  
Envision Energy (Denmark) ApS,  
Silkeborg (DK)

Signed and Sealed this  
Eighteenth Day of July, 2017

Joseph Matal  
*Performing the Functions and Duties of the*  
*Under Secretary of Commerce for Intellectual Property and*  
*Director of the United States Patent and Trademark Office*